Dec. 23, 1947.  B. N. PALM  2,433,150
VARIABLE SPEED TRANSMISSION
Filed Aug. 14, 1944  4 Sheets-Sheet 2

INVENTOR
BERNHARD N. PALM
BY HARRIS, KIECH, FOSTER & HARRIS
FOR THE FIRM
ATTORNEYS

Dec. 23, 1947.   B. N. PALM   2,433,150
VARIABLE SPEED TRANSMISSION
Filed Aug. 14, 1944   4 Sheets-Sheet 3

INVENTOR
BERNHARD N. PALM
BY HARRIS, KIECH, FOSTER & HARRIS
FOR THE FIRM
ATTORNEYS

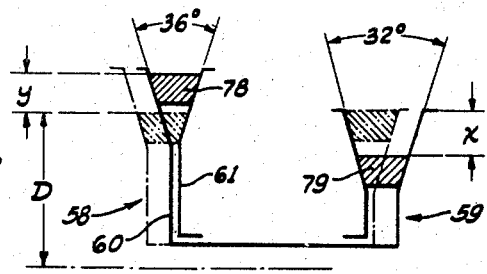
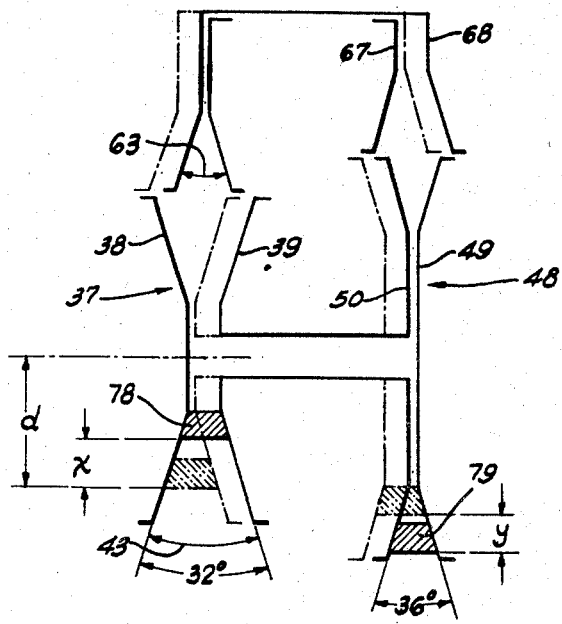
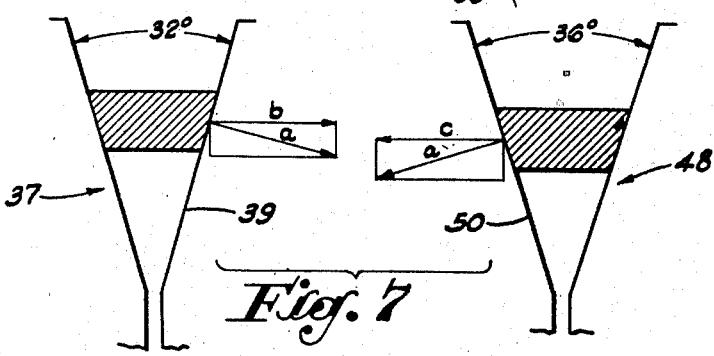

Patented Dec. 23, 1947

2,433,150

UNITED STATES PATENT OFFICE 2,433,150

VARIABLE-SPEED TRANSMISSION

Bernhard N. Palm, San Marino, Calif., assignor to Sterling Electric Motors, Inc., Los Angeles, Calif., a corporation of California Application August 14, 1944, Serial No. 549,356

8 Claims. (Cl. 74—230.17)

My invention relates to the variable-speed transmission art, and, more particularly, to V-belt variable-speed transmissions utilizing pulleys of variable effective diameters connected by a suitable V-belt.

In such transmissions it is standard practice in the art to vary the effective diameters of the pulleys by relatively axially moving one or both pulley flanges of each of the pulleys. The pulley diameters are, of course, varied inversely, so that as the effective diameter of one of the pulleys is increased the effective diameter of the other pulley is decreased, and vice versa.

In such prior art devices it is also standard practice to provide a drive pulley having a maximum effective diameter approximately equal to the minimum effective diameter of the driven pulley so that when the pulleys are adjusted to substantially the same effective diameter, they will provide a one-to-one driving ratio therebetween, adjustment of the pulleys merely reducing the speed of the driven pulley relative to that of the drive pulley, thus operating as an infinitely variable reduction gear throughout the range of adjustment of the device.

It is well known in the art that in variable-speed V-belt transmissions having a pair of straight faced variable-diameter pulleys connected by a belt, the length of the belt path around the pulleys varies in response to the variation of their effective diameters. Thus, where each pulley has a fixed flange and an axially movable flange and the movable flanges are moved axially equal distances to increase the effective diameter of one pulley and decrease the effective diameter of the other pulley, the effective belt path length required will also vary. Such a system provides a minimum belt path length when the pulleys are adjusted to a one-to-one ratio, or as near thereto as is permitted by the system. As the effective diameters of the pulleys are adjusted away from the one-to-one relation, the length of the belt path increases, due to the fact that the area of contact between the belt and the pulley of increasing effective diameter increases faster than the area of contact of the pulley of decreasing effective diameter decreases. If the belt is adequately tight at the one-to-one speed relation, adjustment away from this relation causes the belt to become too loose for efficient operation of the transmission, causing belt slippage and reduction in the possible maximum power output transmitted through the belt. If the belt is provided with sufficient tension to transmit the maximum power at the position of maximum adjustment of the relative effective pulley diameters, it becomes increasingly tight as adjustment of the effective pulley diameters is made toward the one-to-one ratio, with a substantial and undesirable increase in belt wear. This has created a serious design problem in the art, and several expedients have heretofore been adopted to compensate for this normal tendency of the belt path to vary with relative variations in effective pulley diameters. Thus, the patent to Johnson et al., No. 2,259,567, issued October 21, 1941, discloses the conception of relatively moving the flanges of one pulley axially at a faster speed than the speed at which the flanges of the other pulley are relatively moved axially to compensate for changes in belt path length incident to normal relative adjustment of the pulley diameters. Again, the patent to Shaw, No. 2,342,604, issued February 22, 1944, discloses the conception of relatively moving the shafts supporting the pulleys simultaneously with the relative adjustment of the pulley diameters to attempt to compensate for the normal change in belt path length. These expedients which have been adopted in the art to compensate for changes in belt path length have not proved satisfactory, due to the complexity of the mechanism required, or due to other reasons.

It is therefore a primary object of my present invention to compensate for the normal change in belt path length in such a variable-speed transmission by a novel expedient. I accomplish this by providing drive and driven pulleys having pulley flanges with different angles therebetween. Thus, for example, where I utilize a relatively small drive pulley and a relatively large driven pulley, the angle included between the pulley flanges of the drive pulley is sufficiently less than the angle included between the flanges of the driven pulley to cause the effective diameter of the drive pulley to change faster than the effective diameter of the driven pulley, thus maintaining the belt path length substantially constant during all relative adjustments of the pulleys.

A further object of my invention is to provide such a variable-diameter pulley structure in an enclosed transmission, attaining thereby a compactness and simplicity of construction not hitherto obtainable in the art.

As is well known in the art, in variable-speed V-belt transmissions having variable-diameter drive and driven pulleys connected by a belt, when the belt tension is maintained constant through all changes in the speed ratio between the pulleys, the power capable of being delivered by the driven pulley decreases as its rotational speed decreases relative to that of the drive pulley. This is due to the tendency of the belt to slip as its angle of contact with the drive pulley decreases, due to a reduction in effective diameter of the drive pulley relative to that of the driven pulley. Where several sets of such drive and driven pulleys are connected in series, to increase the maximum speed ratio between the first drive shaft and the final driven shaft, the effect is additive, and at the maximum speed ratio therebetween the power capable of being transmitted by the final driven, or output, shaft is considerably less than the power input to the first drive shaft. Such transmissions have generally been described as having "constant torque" characteristics for all speed changes. In many types of installations this is a serious disadvantage because to deliver a predetermined torque from the output shaft at low output shaft speeds requires larger pulleys and belts than are required to deliver the same torque at high output shaft speeds with the same transmission. Thus, to deliver a high torque from the output shaft at low output shaft speeds requires a relatively large and expensive transmission.

It is therefore another important object of my invention to overcome, in at least a measure, the disadvantages just described by providing such a transmission having at least four pulleys in series, the first two and the last two being belt-connected, and the intermediate pulleys being direct-connected, at least one pulley of each set of pulleys being of the variable-diameter type, in which the power output of the output driven pulley at its minimum rotational speed is higher than is possible in the described "constant torque" transmissions of the art. I prefer to accomplish this by maintaining the tension in the second belt, connected to the output pulley, higher than the tension in the first belt connected to the input pulley. In turn, this relative tension of the belts is maintained in my invention by providing pulleys having different included angles between the flanges of some of the pulleys, as described above.

Therefore, a further object of my invention is to provide a variable-speed transmission having an input pulley and an intermediate driven pulley connected by a first belt, an intermediate drive pulley and an output pulley connected by a second belt, all of the variable-diameter type, the included angles between the flanges of the input and intermediate drive pulleys being less, respectively, than the included angles between the flanges of the intermediate driven and output pulleys.

In the variable-diameter V-belt pulley art considerable difficulty has been experienced in insuring axial movement of a pulley flange relative to the shaft on which it is mounted for such movement. Such pulley flanges are frequently made of cast iron, and the shafts on which they are mounted are normally steel, and there is a tendency for moisture to enter therebetween to cause corrosion, which very often causes the flange to gall or seize onto the shaft, which necessitates reconditioning of the unit or replacement of the affected parts. In the past, attempts have been made to remedy this difficulty by various means, for example, by lubrication of the engaging surfaces of the shaft and pulley, or by utilizing bronze or steel, or both, but none of these expedients have proven wholly satisfactory. It is therefore a further object of my present invention to provide a movable pulley flange on a shaft so that no lubrication is necessary therebetween, and so that the tendency of the parts to gall or seize together due to corrosion or gumming therebetween is eliminated. I prefer to accomplish this by separating the movable flange and the shaft, both of which are normally made of metal, by a sleeve formed of a non-corrosive material having a low coefficient of friction with metal, such as, for example, Bakelite.

A further object of my invention is to provide a variable-speed V-belt transmission mechanism mounted on a support for insertion bodily into a suitable housing therefor. This facilitates assembly and repair.

Another object of my invention is to provide an enclosed variable-speed transmission having a number of novel construction features which substantially contribute to the economy and simplicity of the unit and to the ease of assembly and repair, as will appear hereinafter.

Other objects of the invention will appear from the following specification and from the drawings, which are for the purpose of illustration only, and in which:

Fig. 6 is a diagrammatic view illustrating the effect of relative adjustment of pulley diameters by my invention.

Fig. 7 is a diagrammatic view illustrating how greater tension is maintained in the second belt than in the first belt in my invention.

Figure 4:
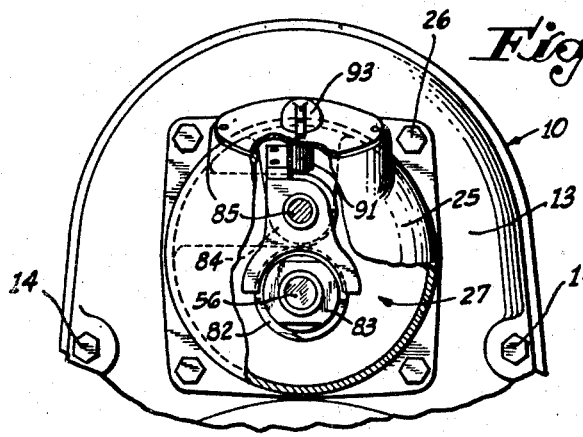
Fig. 4 is a vertical cross-sectional view taken on the line 4—4 of Fig. 1.

Referring to the drawings, I show a main housing 10 having a relatively large opening 11 in one wall thereof and a relatively small opening 12 in an opposite wall thereof. The relatively large opening 11 is adapted to be closed by a cap member 13 suitably secured to the main housing 10, as by bolts 14, as best shown in Fig. 4. The relatively small opening 12 is adapted to be closed by an end bell 16 suitably bolted to the main housing 10, the housing being provided with feet 17. The cap member 13 is similarly provided with feet 15.

The cap member 13 is provided with a large opening 19 and a relatively smaller opening 20, the large opening being adapted to receive and support an end flange 21 of an electric motor 22 which may be rigidly secured to the cap member by suitable bolts 23. Registering with the small opening 20 is an auxiliary housing 25 which is secured to the main housing 10 by suitable bolts 26, as best shown in Fig. 4, and which contains an adjustment mechanism 27 to be described hereinafter.

Located approximately centrally in the main housing 10 and extending thereinto from the wall of the housing is a supporting flange member 28 to which is bolted, by bolts 29, a vertical supporting member 30. The supporting member 30 is formed to provide a first tubular horizontal bearing support 31 and above it a second tubular horizontal bearing support 32.

Figure 1:
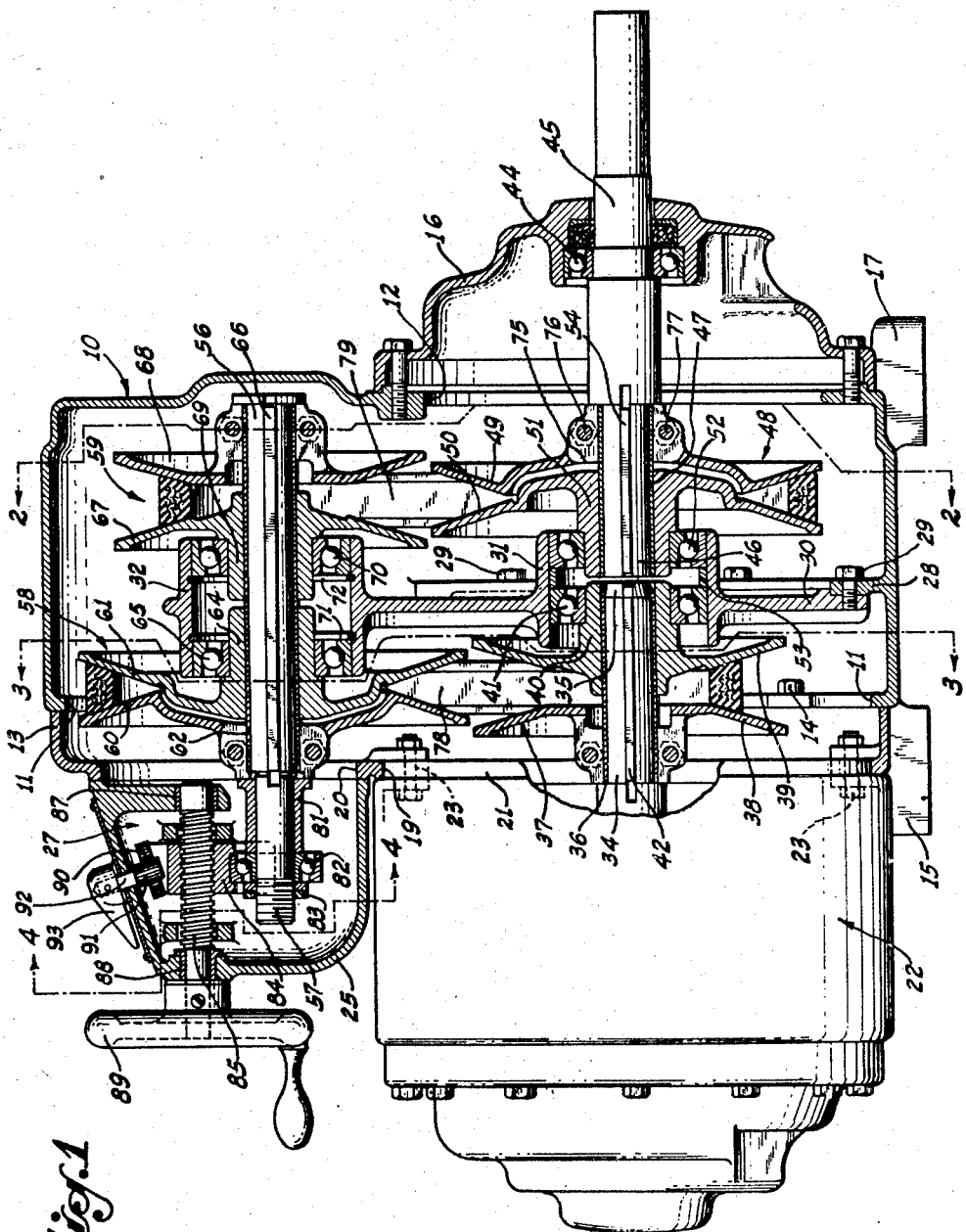
Fig. 1 is a longitudinal sectional view taken through my invention.

The electric motor 22 is provided with a drive shaft 34, the inner end 35 of which is beveled and extends, in the assembled position illustrated in Fig. 1, a substantial distance into the first bearing support 31 in axial alignment therewith. Carried on the drive shaft 34 is a sleeve member 36 formed of a material having a low coefficient of friction with metal and which is non-corrosive, such as, for example, a plastic material, the inner end of which is also beveled and formed to match the taper on the inner end 35 of the drive shaft 34. Disposed on the sleeve member 36 is a drive pulley 37 of the variable-diameter V-type, having a pulley flange 38 rigidly secured relative to the drive shaft, and having a pulley flange 39 axially movable relative thereto, providing an included angle 43 therebetween, as diagrammatically illustrated in Fig. 6. The pulley flange 39 is provided with a tubular hub 40 which extends substantially into the first bearing support 31, being journaled therein by an annular ball bearing 41. The pulley flange 39 is held against rotation relative to the sleeve member 36 and the drive shaft 34 by a key 42 extending into suitable keyways formed in the drive shaft, the sleeve member, and the pulley flange. Thus, the pulley flange 39 is axially movable on the sleeve 36 and drive shaft 34 relative to the pulley flange 38, but is held against rotation relative thereto by the key 42.

The end bell 16 is provided with an annular bearing 44 which journals a driven shaft 45, the inner end 46 of which extends substantially into the first bearing support 31 in axial alignment with the drive shaft 34. Disposed on the inner end 46 of the driven shaft 45 is a sleeve member 47, formed of a plastic material or other suitable material similar to the sleeve member 36, on which is carried a driven pulley 48 of the variable-diameter V-type, having a pulley flange 49 which is fixed on the sleeve member 47, and having a pulley flange 50 axially movable thereon. The pulley flange 50 is provided with a tubular hub member 51 which extends substantially into the first bearing support 31, and is supported therein by an annular ball bearing 52, which is separated from the bearing 41 by an annular spacer ring 53 between the two bearings, the bearings and the spacer ring being axially slidable in the bearing support. The pulley flange 50 is held against rotation relative to the sleeve member 47 and the driven shaft 45 by a key element 54 which extends into suitable keyways formed in the driven shaft, the sleeve member, and the hub 51 of the pulley flange 50, to permit axial movement of the pulley flange 50 relative to the fixed flange 49 and driven shaft 45, but preventing rotational movement therebetween.

Extending through the second bearing support 32 is a countershaft 56 having an outer end 57 extending into the auxiliary housing 25. Disposed on the countershaft 56 are an intermediate driven pulley 58 and an intermediate drive pulley 59. The intermediate driven pulley 58 includes pulley flanges 60 and 61 disposed on a sleeve element 62, formed of a plastic material or other suitable material similar to the sleeve members 36 and 47, carried by the countershaft 56, the pulley flange 60 being rigidly secured thereto and the pulley flange 61 being mounted to permit axial movement therebetween. The pulley flanges 60 and 61 provide an included angle 63 therebetween, as diagrammatically shown in Fig. 6. The pulley flange 61 is provided with a hub 64 which extends into the second bearing support 32 and is journaled therein by an annular bearing 65, the pulley flange 60 being held against rotation relative to the sleeve element 62 and the countershaft 56 by a key 66 which extends through suitable keyways formed in the countershaft, the sleeve element, and the hub. Thus, the key 66 prevents rotational movement of the pulley flange 61 relative to the countershaft 56, but permits relative longitudinal movement therebetween. Similarly, the intermediate drive pulley 59 includes pulley flanges 67 and 68, the pulley flange 68 being rigidly secured relative to the sleeve element 62 and the countershaft 56, and the pulley flange 67 being keyed thereto by the key 66. The pulley flange 67 is also provided with a hub 69 which extends into the second bearing support 32 and is journaled therein by an annular bearing 70. As will be noted, the bearings 65 and 70 are retained against longitudinal movement in the second bearing support 32 by snap rings 71 and 72, respectively, which engage the outer races of the bearings.

As will be noted from the foregoing description, the sleeve members 36 and 47 and the sleeve element 62 are all formed of a non-corrosive material having a low coefficient of friction with metal, such as a plastic material, and this is an important feature of the invention. Since such sleeves are formed of non-corrosive material, there is little tendency of the metal of the pulley flanges, which are normally formed of cast iron, to gall and seize, and no lubrication is required. In some installations, it may be desirable to utilize such sleeves having powdered graphite or carbon therein, and thus further reduce the coefficient of friction with the metal pulley flanges. Utilizing such specially designed sleeves, I have found that there is comparatively little tendency to gall or seize, even after relatively long periods of operation without axial movement of the pulley flanges relative to the sleeves. This is not true in the usual metal-to-metal constructions used in the art, in which this tendency to gall or seize is very pronounced and troublesome.

Figure 2:
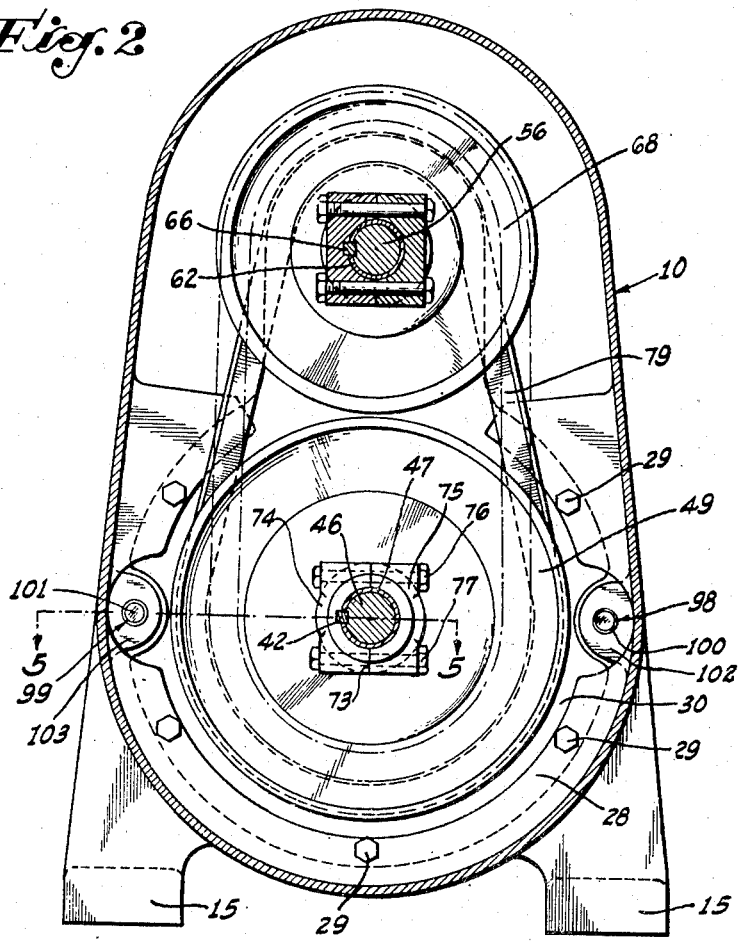
Fig. 2 is a vertical cross-sectional view taken on the line 2—2 of Fig. 1.

As illustrated in Figs. 1 and 2, the hub of the pulley flange 49 is split by a cut 73 to form two halves 74 and 75 which are bolted together by bolts 76 and 77 to form the complete circular pulley flange. By this construction, the pulley flange 49 is rigidly and immovably clamped onto the sleeve member 47 and the driven shaft 45. The pulley flange 68, as shown in Fig. 2, is similarly formed, and the pulley flanges 38 and 60 are also similarly formed. The hubs of the inner flanges of all of the pulleys, being the flanges 39, 61, 50, and 67, are all formed in one piece, and, as pointed out hereinabove, such flanges are mounted to permit relative movement with the sleeves on which they are mounted. As illustrated in Fig. 1, the drive pulley 37 is operatively connected to the intermediate driven pulley 58 by a first belt 78, and the intermediate drive pulley 59 is operatively connected to the driven pulley 48 by a second belt 79, as is well known in the art.

As will be noted from Fig. 1, the drive pulley 37 and the intermediate drive pulley 59 are preferably of substantially the same diameter, and the driven pulley 48 and the intermediate driven pulley 58 are preferably similarly of substantially the same diameter. These diameters are such that the maximum effective diameters of the drive pulley 37 and the intermediate drive pulley 59 are substantially equal to the minimum effective diameters of the driven pulley 48 and the intermediate driven pulley 58 when the pulleys are adjusted to their one-to-one ratio, as described hereinafter. This is diagrammatically illustrated in Fig. 6, in which in dotted lines the drive pulley 37 is shown to be adjusted to its maximum effective diameter and the intermediate driven pulley 58 is shown in dotted lines to be adjusted to its minimum effective diameter, the diameters represented by d and D, respectively, being equal in this position of adjustment. Also, as illustrated in Fig. 6, the included angle 43 between the flanges 38 and 39 of the drive pulley 37 is substantially less than the included angle 63 between the flanges 60 and 61 of the driven pulley 58, for a purpose to be described hereinafter. In the commercial embodiment illustrated in the drawings, the included angle 43 between the pulley flanges 38 and 39 of the drive pulley 37 is equal to approximately 32°, whereas the included angle 63 between the pulley flanges 60 and 61 of the intermediate driven pulley 58 is equal to approximately 36°. As will be understood, the included angle between the pulley flanges 67 and 68 of the intermediate drive pulley 59 is the same as that of the drive pulley 37, and the included angle between the pulley flanges 49 and 50 of the driven pulley 48 is the same as the included angle between the flanges of the intermediate driven pulley 58.

As best shown in Fig. 1, the outer end 57 of the countershaft 56 is provided with a spacing sleeve 81, the outer end of which engages the inner race of an annular ball bearing 82 which is secured in place by means of suitable lock nuts 83 threaded on the outer end of the countershaft. The outer race of the bearing 82 fits into a suitable notch in a traveling nut 84, which in turn is threaded on a lead screw 85. The lead screw 85 is journaled for rotation in bearings 87 and 88 in the auxiliary housing 25, the outer end of the lead screw extending out of the auxiliary housing and being provided with a suitable handwheel 89. The traveling nut 84 is provided with an angled rack 90 which is engaged by a pinion 91 on a trunnion 92 which extends outwardly through the top wall of the auxiliary housing and has secured thereto a pointer knob 93. As will be understood, rotation of the hand-wheel 89 rotates the lead screw 85, causing the traveling nut 84 to move axially thereon, thus rotating the pinion 91 and the pointer knob 93 to indicate the position of adjustment of the mechanism.

Figure 5:
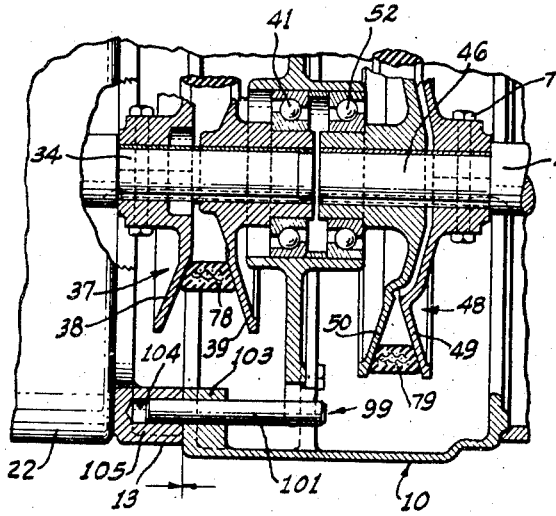
Fig. 5 is a fragmentary horizontal cross-sectional view taken on the line 5—5 of Fig. 2.
Figure 3:
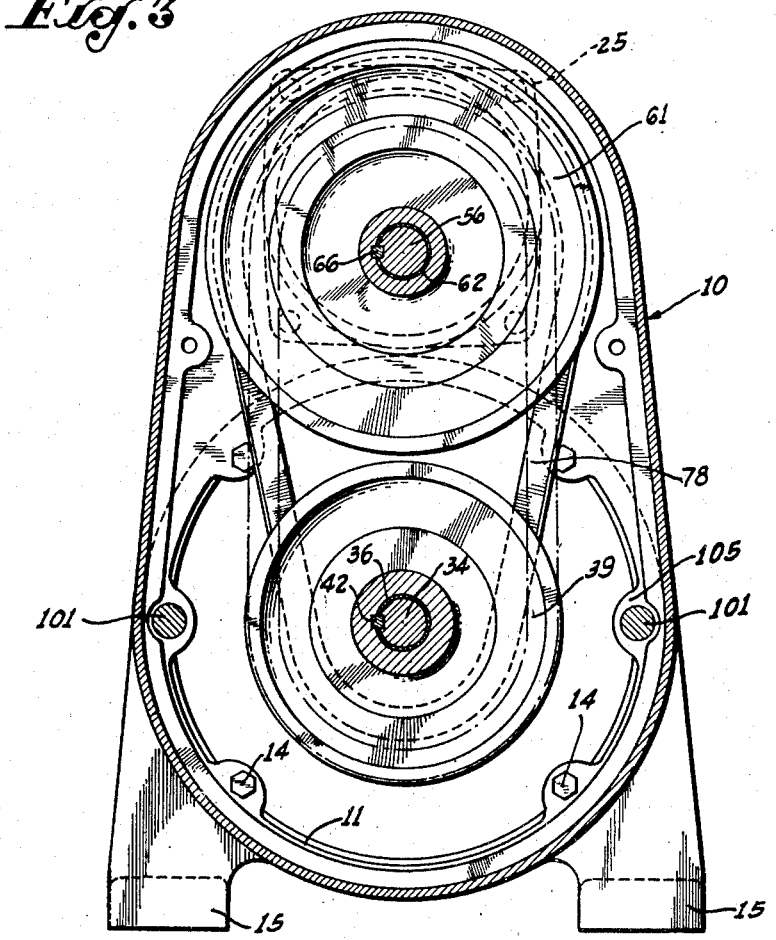
Fig. 3 is a vertical cross-sectional view taken on the line 3—3 of Fig. 1.

The cap element 13 is partially supported relative to the housing 10 and is adapted to be guided in movement relative thereto, by guide means 98 and 99, which are identical in construction, as best illustrated in Figs. 2 and 5, and which are provided with guide pins 100 and 101, respectively, which respectively pass through bosses 102 and 103 formed in the housing 10. The outer ends of the pins 100 and 101 are press-fitted into, or otherwise rigidly secured to, the cap element 13, the guide pin 101 being press-fitted into an opening 104 formed in a boss 105 on the cap element, and it is to be understood that the guide pin 100 may be similarly held to the cap element.

In assembling the unit, the electric motor 22 is preferably first secured to the cap element 13, as described above, the drive shaft 34 having assembled thereon the sleeve 36 and the pulley flange 38. The movable pulley flange 39 is then journaled in the bearing 41. The guide pins 100 and 101 are sufficiently long that they can be pressed into the openings in the bosses 102 and 103, respectively, before the inner end 35 of the drive shaft 34 enters the hub 40 of the movable pulley flange 39, and thus the guide means 98 and 99 serve to guide the inner end 35 of the drive shaft into the hub 40 of the pulley flange 39, and this is an important feature of my construction.

As will also be observed, the vertical supporting member 30 substantially supports the entire internal mechanism of the transmission, which is an important feature of the invention, as it may, if desired, be readily bolted to any desired supporting structure without use of the housing 10. In other words, this feature provides a construction which may be mounted in various ways to meet required conditions, and provides considerable flexibility of use. Also, removal from the housing 10 of the vertical supporting member 30 and the transmission mechanism mounted thereon is very simple and quick, to facilitate replacement or repair of parts.

In operation, as will be understood, rotation of the drive shaft 34 by the electric motor 22 is transmitted by the drive pulley 37 through the first belt 78 to the intermediate driven pulley 58, which in turn rotates the countershaft 56, causing corresponding rotation of the intermediate drive pulley 59, which is transmitted through the second belt 79 to the driven pulley 48 and the driven shaft 45. The speed ratio between the drive shaft 34 and the driven shaft 45 is varied, as will be understood, by changing the relative effective diameters of the pulleys. This is accomplished by actuation of the adjustment mechanism 27. Thus, when the hand-wheel 89 is rotated so as to move the traveling nut 84 to the left, as seen in Fig. 1, the countershaft 56 with the pulley flanges 60 and 68 rigid thereon is likewise moved to the left to decrease the effective diameter of the intermediate driven pulley 58 and to increase the effective diameter of the intermediate drive pulley 59. As soon as the flange 60 is moved away from the flange 61 of the intermediate driven pulley 58, the belt 78 tends to become loose, and as the movable flange 68 is moved toward the fixed flange 67 of the intermediate drive pulley 59, the belt 79 tends to become tighter, thus setting up a wedging action between the flanges 49 and 50 of the driven pulley 48 tending to separate them. Such a wedging action causes the flange 50 to move to the left, as seen in Fig. 1, which moves the flange 39 of the drive pulley 37 similarly to the left by a corresponding amount, through the thrust bearings 41 and 52 and the spacer ring 53.

As pointed out above, the drive pulley 37 and the intermediate drive pulley 59 have an included angle 43 between their flanges which is less than the included angle 63 between the flanges of the driven pulley 48 and the intermediate driven pulley 58. In the construction shown, the included angle 43 between the flanges of the drive pulley 37 and the intermediate drive pulley 59 is aproximately 32°, whereas the included angle 63 between the flanges of the driven pulley 48 and the intermediate pulley 58 is approximately 36°. These angles have been determined empirically for the specific unit illustrated, and are dependent upon pulley sizes, power to be transmitted, maximum speed ratio, and other factors. Consequently, I do not desire to be limited to the specific figures given for the included angles, as the conception can readily be applied by one skilled in the art to other embodiments of the invention. This construction provides two important and desirable results. First, the provision of different included angles between the flanges of a pair of variable-diameter V-belt pulleys connected by a belt permits equal axial movement between the flanges of both pulleys, but maintains belt tension therebetween substantially constant. Secondly, in the multiple belt construction illustrated and described, it insures that the second, or output, belt at all times runs tighter than the first, or input, belt, which, at low speeds of the driven pulley, provides a greater power output than is otherwise possible with a unit of the same size. These results are explained by the following description.

The maintenance of satisfactory belt tension throughout adjustment of effective pulley diameter is diagrammatically illustrated by Fig. 6. As illustrated in Fig. 6, the full lines illustrate the pulleys shown in Fig. 1 in the same operational position, i. e., to provide the greatest speed variation between the drive pulley 37 and the driven pulley 48, which, in the particular unit illustrated, is a four-to-one speed relation. The dotted lines in Fig. 6 indicate the adjustment of the pulleys to provide substantially a one-to-one speed ratio between the drive pulley 37 and the driven pulley 48. As the effective pulley diameters of the pulleys are adjusted, as described above, from the full line positions of Fig. 6 to their dotted line positions as shown therein, the effective diameters of the drive pulley 37 and intermediate drive pulley 59 are increased, and the effective diameters of the driven pulley 48 and the intermediate driven pulley 58 are reduced. Due to the fact that the included angle 43 between the flanges of the drive pulley 37 and intermediate drive pulley 59 is less than the included angle 63 between the flanges of the driven pulley 48 and the intermediate driven pulley 58, the effective diameters of the drive pulley and intermediate drive pulley increase at a faster rate than that at which the effective diameters of the intermediate driven pulley and the driven pulley decrease, respectively. This maintains the length of the effective belt paths of the belts 78 and 79 sufficiently constant to maintain belt tension in both belts within practical limits. This effect is illustrated in Fig. 6, which shows the maximum change of effective diameters of the drive pulley 37 and intermediate drive pulley 59, represented by $x$, to be substantially greater than the maximum change of effective diameters of the driven pulley 48 and intermediate driven pulley 58, as represented by $y$. As will be understood, adjustment from the one-to-one driving ratio, shown in dotted lines in Fig. 6, to the four-to-one driving ratio shown in full lines therein, will have the reverse effect, i. e., the effective diameters of the drive pulley 37 and intermediate drive pulley 59 will be reduced faster than the effective diameters of the intermediate driven pulley 58 and the driven pulley 48, respectively, will be increased, thus maintaining belt tension in both belts 78 and 79 within practical limits.

The maintenance of greater belt tension in the belt 79 than in the belt 78, by the use of different included angles between the pulley flanges as described, is diagrammatically illustrated in Fig. 7, which diagrammatically shows one half of the drive pulley 37 and one half of the driven pulley 48, the halves being placed side by side for easier comparison. As shown in Fig. 1, and as diagrammatically illustrated in Fig. 7, the pulley flanges 39 and 50 are directly connected together and move axially in unison. The tension in the belts 78 and 79 tends to separate the pulley flanges of both of the pulleys 37 and 48, the flanges 39 and 50 working in opposition to each other. If the belts 78 and 79 are initially adjusted upon assembly to the same belt tension, such as, for example, 100 pounds tension, the forces exerted by the belts tending to move the pulley flanges 37 and 50 axially in opposition to each other may be represented by $a$, shown in the force diagrams of Fig. 7. The force represented by $a$, caused by belt tension in each belt, is perpendicular to the face of each pulley flange, and therefore the horizontal components of these forces are represented by $b$ and $c$ for pulleys 37 and 48, respectively, and it will be understood that due to the difference in included angles between the pulley flanges of each, the force tending to move the flange 39 to the right is initially greater than the force tending to move the flange 50 to the left, as seen in Figs. 1, 6, and 7. Thus, in operation, the pulley flange 39 of the drive pulley 37 will actually move to the right against the opposition of the pulley flange 50 of the driven pulley 48 until increased belt tension caused thereby in the belt 79 will increase the horizontal force component $c$ to a point at which the forces represented by the components $b$ and $c$ balance, at which time the second belt 79 will be substantially tighter than the first belt 78.

Belt wear in any V-belt transmission is a function of the belt tension and the number of belt passes per unit of time. Thus, with the same tension, an increase in the number of belt passes per unit of time will increase the amount of belt wear. Excessive belt wear is undesirable, and, if the device described herein were operated the majority of the time at or near its one-to-one speed ratio, the resulting wear on the second belt 79 might be excessive in some installations. However, such transmissions are usually operated the majority of their operational time at a higher speed ratio, in which case my invention provides definite advantages. For example, by maintaining tension in the second belt 79 greater than the tension in the first belt 78, belt wear tends to equalize between the two belts if the second belt is operated the majority of the time at a lower speed than the first belt. Secondly, by operating the second belt 79 at greater tension than the first belt 78, a larger power output can be delivered thereby at the lower speeds than otherwise could be so delivered, in view of the fact that the possible maximum of power output with a given transmission increases with an increase in belt tension. Thus, by my invention a greater power output can be obtained by maintaining belt tension in the second belt 79 higher than that in the first belt 78, without undue belt wear or other loss of efficiency.

While I have shown and described a preferred embodiment of the invention, it will be appreciated that changes may be made in the construction without departing from the spirit of my invention. Consequently, I do not desire to be limited to the specific construction set forth, but desire to be afforded the full scope of the following claims.

I claim as my invention:

1. In a variable-speed transmission, the combination of: a main housing having an opening in one wall thereof; a cap member adapted to be secured to said main housing to close said opening, said cap member having a first aperture and a second aperture therein; a drive pulley of the variable-diameter V-belt type in said main housing; a driven pulley of the variable-diameter V- belt type in said main housing; supporting means for supporting said pulleys in said main housing, said supporting means with said pulleys thereon being removable from said main housing through said opening; an electric motor supported in said first aperture and having a drive shaft extending through said first aperture and operatively connected to said drive pulley; an auxiliary housing connected to said main housing so as to close said second aperture; and adjustment means in said auxiliary housing and operatively connected to said driven pulley through said second aperture to vary the effective diameter thereof, said motor and said auxiliary housing being separately removable from said cap member or removable together with said cap member from said main housing.

2. In a variable-speed V-belt transmission, two pairs of pulleys, one of said pairs being connected by one V-belt, and the other pair being connected by another V-belt, each of said pulleys consisting of a primary and a secondary coned disc, the included angle between the cones of the primary and secondary discs of the driving pulley of each pair being less than the included angle between the cones of the primary and secondary discs of the driven pulley of said pair.

3. In a variable-speed transmission, the combination of: a driving shaft; a driving pulley carried by and rotated from said driving shaft; a driven shaft; and a driven pulley carried by and rotating said driven shaft, each of said pulleys consisting of a fixed member restrained from movement in the direction of the axis of its shaft and a movable member free to move within limits in said direction, each of said members having a frusto-conical face concentric with said axis, the faces of the two members forming each pulley cooperating to form therebetween an annular space of keystone section on a plane in which said axis lies, the angle subtended between the sides of the keystone section defined by the conical faces of the driving pulley being greater than the angle so subtended by the keystone section of the driven pulley.

4. In a variable-speed transmission, the combination of: a driving shaft; a driving pulley carried by and rotated from said driving shaft; a driven shaft; and a driven pulley carried by and rotating said driven shaft, each of said pulleys consisting of a fixed member restrained from movement in the direction of the axis of its shaft and a movable member free to move within limits in said direction, each of said members having a frusto-conical face concentric with said axis, the faces of the two members forming each pulley cooperating to form therebetween an annular space of keystone section on a plane in which said axis lies, the angle subtended between the sides of the keystone section defined by the conical faces of the driving pulley being greater than the angle so subtended by the keystone section of the driven pulley, the maximum effective diameter of the driving pulley being substantially equal to the minimum effective diameter of said driven pulley.

5. In a variable-speed transmission, the combination of: a driving shaft; a driving pulley on said driving shaft; a driven shaft; a driven pulley on said driven shaft; an intermediate driven pulley; an intermediate driving pulley; and an intermediate shaft on which said intermediate driven and driving pulleys are carried, each of said pulleys consisting of a fixed member restrained from movement in the direction of the axis of its shaft and a movable member free to move within limits in said direction, each of said members having a frusto-conical face concentric with said axis, the faces of the two members forming each pulley cooperating to form therebetween an annular space of keystone section on a plane in which said axis lies, the angle subtended between the sides of the keystone section defined by the conical faces of the driving pulley being greater than the angle so subtended by the keystone section of the driven pulley.

6. In a variable-speed transmission, the combination of: a driving shaft; a driving pulley on said driving shaft; a driven shaft; a driven pulley on said driven shaft; an intermediate driven pulley; an intermediate driving pulley; and an intermediate shaft on which said intermediate driven and driving pulleys are carried, each of said pulleys consisting of a fixed member restrained from movement in the direction of the axis of its shaft and a movable member free to move within limits in said direction, each of said members having a frusto-conical face concentric with said axis, the faces of the two members forming each pulley cooperating to form therebetween an annular space of keystone section on a plane in which said axis lies, the angle subtended between the sides of the keystone section defined by the conical faces of the driving pulley being greater than the angle so subtended by the keystone section of the driven pulley, the maximum effective diameter of the driving pulley being substantially equal to the minimum effective diameter of said driven pulley.

7. In a variable-speed transmission, the combination of: a driving shaft; a driving pulley on said driving shaft; a driven shaft; a driven pulley on said driven shaft; an intermediate driven pulley; an intermediate driving pulley; an intermediate shaft on which said intermediate driven and driving pulleys are carried, each of said pulleys consisting of a fixed member restrained from movement in the direction of the axis of its shaft and a movable member free to move within limits in said direction, each of said members having a frusto-conical face concentric with said axis, the faces of the two members forming each pulley cooperating to form therebetween an annular space of keystone section on a plane in which said axis lies, the angle subtended between the sides of the keystone section defined by the conical faces of the driving pulley being greater than the angle so subtended by the keystone section of the driven pulley; and means connecting the movable members of said intermediate driving and driven pulleys so that they are at all times the same axial distance apart.

8. In a variable-speed transmission, the combination of: a driving shaft; a driving pulley on said driving shaft; a driven shaft; a driven pulley on said driven shaft; an intermediate driven pulley; an intermediate driving pulley; an intermediate shaft on which said intermediate driven and driving pulleys are carried, each of said pulleys consisting of a fixed member restrained from movement in the direction of the axis of its shaft and a movable member free to move within limits in said direction, each of said members having a frusto-conical face concentric with said axis, the faces of the two members forming each pulley cooperating to form therebetween an annular space of keystone section on a plane in which said axis lies, the angle subtended between the sides of the keystone section defined by the conical faces of the driving pulley being greater than the angle so subtended by the keystone section of the driven pulley, the maximum effective diameter of the driving pulley being substantially equal to the minimum effective diameter of said driven pulley; and means connecting the movable members of said intermediate driving and driven pulleys so that they are at all times the same axial distance apart.

BERNHARD N. PALM.

REFERENCES CITED

The following references are of record in the file of this patent:

UNITED STATES PATENTS

| Number | Name | Date |
|---|---|---|
| 1,929,836 | Brown | Oct. 10, 1933 |
| 1,993,547 | Heyer | Mar. 5, 1935 |
| 2,205,976 | Heyer | June 25, 1940 |
| 2,342,604 | Shaw | Feb. 22, 1944 |
| 2,248,948 | Bowers | July 15, 1941 |
| 2,351,148 | Rafter | June 13, 1944 |
| 2,185,545 | Egan | Jan. 2, 1940 |
| 2,308,852 | Backus | Jan. 19, 1943 |
| 2,293,617 | Myers | Aug. 18, 1942 |
| 2,207,073 | Shields | July 9, 1940 |
| 2,293,638 | Clarkson | Aug. 18, 1942 |
| 2,348,940 | Voegeli | May 16, 1944 |
| 583,403 | Reeves | May 25, 1897 |
| 1,926,269 | Easter | Sept. 12, 1933 |
| 2,251,488 | Hucke | Aug. 5, 1941 |